United States Patent [19]
Ando et al.

[11] Patent Number: 5,591,491
[45] Date of Patent: Jan. 7, 1997

[54] METHOD FOR MANUFACTURING BIODEGRADABLE MOLDED ARTICLES

[75] Inventors: Sadamasa Ando, Minoo; Taizo Karasawa, Ibaraki; Akio Ozasa, Kyoto, all of Japan

[73] Assignee: Nissei Kabushiki Kaisha, Osaka, Japan

[21] Appl. No.: 383,024

[22] Filed: Feb. 2, 1995

[30] Foreign Application Priority Data

Feb. 4, 1994 [JP] Japan ................................ 6-012941

[51] Int. Cl.$^6$ .................................................... B05D 3/06
[52] U.S. Cl. .......................... 427/544; 99/358; 264/51; 264/53; 264/450; 264/451; 426/244; 426/245; 427/316; 427/545
[58] Field of Search .......................... 426/244, 245; 99/358; 219/771; 264/51, 53, 472, 474, 475, 476, 450, 451; 422/22; 427/591, 592, 316, 544, 545

[56] References Cited

U.S. PATENT DOCUMENTS 4,522,834   6/1985   Miyahara et al. ................. 426/231

*Primary Examiner*—Michael Lusignan
*Attorney, Agent, or Firm*—Jordan and Hamburg

[57] ABSTRACT

A mixture in the form of slurry obtained from mixing a soybean protein, sugar and water is placed between a pair of electrodes. Then, an electroconductive heating process is applied to the mixture under an applied voltage between the electrodes for a predetermined time period, thereby obtaining the sheet-like biodegradable molded article. In this method, the biodegradable molded articles have a homogeneous structure and can be prepared in a short period of time without increasing the cost of equipment of creating unfavorable working conditions.

22 Claims, 1 Drawing Sheet

FIG. 1

METHOD FOR MANUFACTURING BIODEGRADABLE MOLDED ARTICLES

BACKGROUND OF THE INVENTION

The present invention relates to a method for manufacturing biodegradable molded articles which can be decomposed by microbes, bacteria, etc., in the soil.

Generally, plastics are used as materials for molded articles such as containers, packaging materials, etc. However, plastics have the following disadvantages which give rise to problems in their waste treatment after use. In such molded articles the biodegradability thereof is extremely low and sometimes even a toxic gas is generated when incinerated. Thus, the difficulties in the waste disposal (burying, incinerating, composting, etc.,) of the plastics create serious social problems.

In place of the described molded articles made from plastics, recently biodegradable molded articles have been used which can be decomposed by microbes, bacteria, etc., in the soil. As described, since the biodegradable molded articles can be easily decomposed in the soil, the problem associated with the waste disposal of the conventional molded articles made from plastics can be eliminated. Moreover, such biodegradable molded articles are safe to use as containers for foods.

Conventionally, the described biodegradable molded articles are manufactured by placing a biodegradable raw material in a mold heated beforehand to a predetermined temperature, and with an application of conventional thermal conductive heating. Alternatively, the biodegradable molded articles may be formed in any shapes as desired with an application of pressure by means of a high pressure press.

However, the above-noted conventional heating process creates the following problems.

1) From the heated mold, heat is dissipated not only to the materials placed in the mold, to be heated, but also into the area surrounding the mold, thereby presenting the problem of poor energy efficiency.

2) Furthermore, because of this excess heat dissipation, the temperature of the area surrounding the manufacturing device increases, thereby resulting in unfavorable working conditions; and 3) Since a long time is required for entirely transferring heat to the materials to be molded placed in the mold, it is difficult to complete the process in a short time, thereby resulting in low productivity.

4) In order to complete the process in a short time, if the mold heated beforehand to a higher temperature is used, a great difference in temperature arises between the surface portion of the molded article and the inside portion of the molded article, thereby presenting the problem of non-homogeneous structure of the resulting molded article; and 5) Since the mold must be heated to a predetermined temperature beforehand, excess energy as well as time is required.

Meantime, the method to be preformed under an applied pressure by means of the high-pressure press creates the following problems.

1) The device itself becomes larger in size, and the production facilities of large scale are required;

2) Large noise and great vibrations occur in the manufacturing process, thereby presenting the problem of unfavorable working conditions; and 3) Since the method requires the generation of high pressure, it is necessary to be cautious during the dangerous operation.

SUMMARY OP THE INVENTION

An objective of the present invention is to provide a method for manufacturing biodegradable molded articles, with an improved energy efficiency, the method enabling a mass production and shorter processing time while ensuring high quality, without creating the problem of adverse working conditions nor requiring high costs for facility investment, for example, an apparatus of large scale.

In order to achieve the above objective, the first method for manufacturing the biodegradable molded article in accordance with the present invention is characterized in that electroconductive heating is applied to the biodegradable raw materials.

In order to achieve the above objective, the second method for manufacturing the biodegradable molded article in accordance with the present invention is characterized in that the biodegradable molded articles are manufactured by applying the electroconductive heating process to proteins that can be uniformly mixed with water or the material including such proteins in a presence of water.

In order to achieve the above objective, the third method for manufacturing the biodegradable molded articles in accordance with the present invention is characterized in that a binding agent is mixed with proteins having a water content of not more than 10%, or with materials containing such proteins, and the electroconductive heating process is applied to the resulting mixture.

In order to achieve the above objective, the fourth method for manufacturing the biodegradable molded articles is characterized in that the electroconductive heating process is applied residues remaining after taking out essential portions of effective elements from foods and/or food materials, such as by-products or wastes in food processing.

In order to achieve the above objective, the fifth method for manufacturing the biodegradable molded articles is characterized in that the electroconductive heating process is applied to grains, powdered grains, and/or starches or materials including the above after being mixed and or kneaded with water.

The present invention is directed to a method of using electroconductive heating for manufacturing biodegradable molded articles which can easily be disposed of. According to described electroconductive heating process, heat can be generated from the materials to be molded themselves. Therefore, the heat loss can be reduced, thereby enabling an improved energy efficiency and also enabling heat to be applied to the materials to be molded more uniformly in a shorter period of time. Therefore, temperature fluctuation in heating of the resulting molded article is less likely to occur, and the molded articles having the homogeneous structure can be manufactured in a shorter period of time, thereby improving productivity. According to the described electroconductive heating process, the cost for the manufacturing facility can be reduced as an apparatus of large scale is not required compared with the pressure-forming process, and noise or vibrations are not likely to occur, thereby eliminating the problem of unfavorable working conditions.

When the method for manufacturing the biodegradable molded articles by the electroconductive heating process is applied to the first method, or to the second through fifth methods, the following effects can be achieved depending on the properties of the materials to be formed into the molded articles, and the biodegradable molded articles having a homogeneous structure can be prepared in a short period of time without requiring high expense for the manufacturing facility nor creating an unfavorable working condition.

More specifically, according to the second and third methods, the mixture has a desirable fluidity before applying heat thereto, and thus unevenness or stickiness are not likely to occur, thereby improving efficiency in preparing the biodegradable molded articles. Furthermore, in the third method, since molded articles having a low water content can be obtained, reduction in weight of the resulting biodegradable molded article over time is less likely to occur.

Therefore, using the mixture having a desirable fluidity without generating unevenness nor stickiness results in biodegradable molded articles which have a homogeneous structure, and improved strength, whose weight is less likely to be reduced and which can be obtained in a shorter period of time without requiring high costs for the manufacturing facility investments nor creating the problem of unfavorable working conditions.

As described, according to the fourth method, the biodegradable molded articles can be manufactured by effectively re-utilizing the residues remaining after taking out the essential portion of the effective component of the foods and or food materials.

By manufacturing biodegradable molded articles in accordance with the present invention using the above-described residues as the materials, it is possible to efficiently re-utilize the useless portions which results from various food processing on an industrial scale. These useless portions are normally called wastes or by-products and are called the residues in the present invention. At present, there is no other practical treatment of these useless portions (residues) than to simply discard them as waste or garbage. Therefore, we can reduce waste disposal problems associated with these useless portions, which normally take a great deal of time, labor and cost, and waste precious resources, such as those used for incineration and landfills.

Moreover, the biodegradable molded articles having a homogeneous structure can be manufactured in a short period of time by effectively re-utilizing the by-products or wastes, without increasing the costs for the manufacturing facility or creating unfavorable working conditions.

According to the fifth method, biodegradable molded articles having sufficient strength against impact while being used or stored can be manufactured.

Therefore, the biodegradable molded articles having sufficient strength in their use and storage and a desirable homogeneous structure can be manufactured in a short period of time without increasing the cost for the manufacturing facility or creating unfavorable working conditions.

DETAILED DESCRIPTION OF THE PREFERRED EMBODIMENTS

The examples of the present invention are shown below. However, the present invention is not limited to those preferred embodiments, and variations with respect to for example the kinds and proportions of materials to be used and the preparing conditions, etc., are permitted within the scope of the present invention.

EXAMPLE 1

In this example, the biodegradable molded articles were prepared using an electroconductive heating device. The electroconductive heating device is provided with an AC power source (frequency: 60 Hz) and a pair of electrodes connected thereto. The AC power source enables the voltage to be set to any voltage as desired within a range of 30–220 V. In this example, sheet-like biodegradable molded articles are prepared.

Materials of the molded article were combined in the proportion shown in Table 1, and were placed in a mixer to be mixed and kneaded therein, thereby obtaining the mixtures A and B in the form of dough or slurry.

TABLE 1

| Composition | Material | Proportion (% by weight) |
| --- | --- | --- |
| A | soybean protein | 40 |
|   | sugar | 20 |
|   | water | 40 |
|   | flour | 33.3 |
|   | starch | 22.7 |
|   | sugar | 3.3 |
| B | oil | 1.7 |
|   | emulsifying agent | 0.3 |
|   | salt | 1.0 |
|   | water | 37.7 |

A predetermined amount of composition A was placed between the pair of electrodes in the electroconductive heating device, and a predetermined current was applied from the AC power source to perform the electroconductive heating process under an applied voltage across the electrodes, thereby preparing sample A. Here, the voltage to be applied to the electrodes is determined depending on the materials to be molded, the size of the molded article and the conditions of the materials to be molded, etc. Composition B was also placed between the pair of electrodes under an applied voltage, thereby obtaining sample B. In preparing the samples A and B, the electroconductive heating process was applied while observing changes at every predetermined time period. The results of observations of samples A and B are shown in Table 2.

For comparison, compositions A and B prepared using the same materials as above were placed between the heating plates the heaters heated to 180° C. beforehand (conventional thermal conductive heating), and comparative samples A' and B' were obtained. Under an applied heat, changes in comparative samples A' and B' were observed at the same time period as samples A and B. The results of the observations of comparative samples A' and B' are also shown in Table 2.

TABLE 2

| States of Samples | |
| --- | --- |
| A-B (electro-conductive heating) | A'-B' (conventional thermal conductive heating) |
| 5 (s) Temperature was raised uniformly. Steam was generated also from the inside portion. | Only the temperature of the surface in contact with the heating plate was raised, and no changes were observed in |

TABLE 2-continued

States of Samples

| | |
|---|---|
| 10 (s) Foams were formed uniformly, and while expanding the volume, the composition was formed into a uniform sheet. | the inside portion. The evaporation of moisture started only from the surface in contact with the heating plate but the inside portion remains at low temperature. |
| 15 (s) Uniform foam formation and expansion were stopped, and the composition started drying uniformly. | The surface in contact with the heating plate was formed in a foamable film, but no changes were observed from the inside portion. |
| 30 (s) A sheet having a homogeneous structure uniformly was formed. | The dried portion was gradually expanded toward the inside portion, but the water content in the composition still remained high, and had soft texture. More time was need to obtain a sheet as desired. |

As clearly shown by the results of the observations, the method of this example using the electroconductive heating process enables formation of biodegradable molded articles having a uniform foam formation from the surface portion to the inside portion in a shorter period of time compared with the conventional method of thermal conductive heating. By using the described electroconductive heating process, heat is generated from the materials to be molded themselves, and the temperature of the materials to be molded can be raised uniformly in a short period of time. Therefore, since differences in temperature between the surface portion and the inside portion of the materials to be molded are not likely to occur, the heating speed as a whole can be increased, thereby preparing the biodegradable molded articles having a homogeneous structure in a shorter period of time.

Compared with the method adopting the conventional thermal conductive heating process, which creates the problem of heat dissipation to the surrounding area, the method used in this example results in a smaller heat loss, and improved energy efficiency, and in the meantime, the temperature rise in the working environment can be suppressed. Furthermore, the method of this example can eliminate the problems associated with the conventional pressure forming method, such as generation of noise and vibrations, high cost for manufacturing facilities, for example, because an apparatus of large scale, is required etc.

The conditions for performing the electroconductive heating process (applied voltage, frequency, heating time, etc.,) are not limited to the above-noted conditions, and the suitable conditions vary depending on the materials to be used, the size of the molded articles, etc. Therefore, when preparing the biodegradable molded articles using materials other than those used in samples A and B, by changing conditions such as the applied voltage, frequency, heating time, etc., in applying the electroconductive heating process depending on the materials to be used, above-noted effects can be ensured in various applications of the biodegradable molded articles for respective uses.

Namely, in order to achieve an improved working efficiency, for example, in preparing sample A, a soybean protein that can be uniformly mixed with water may be used as a principal component. However, in place of water, the binding agent such as a plasticizer may be used in order to uniformly mix the materials without creating clumps, a nor non-homogeneous structure, etc. Therefore, by adopting the electroconductive heating process, biodegradable molded articles of high quality can be prepared with an improved efficiency.

As described, with the use of the binding agent, since the water content of the composition as a whole decreases, the foam formation under the electroconductive heating can be homogeneous, thereby resulting in a high uniformity of biodegradable molded articles having a homogeneous structure. Additionally, after formation of the biodegradable molded articles, the amount of reduction in their weight can be reduced. Further, by using the binding agent in place of water, biodegradable molded articles made from a material which is difficult to be mixed with water, such as powdered wheat gluten, etc., as a principal material can be obtained.

The materials including proteins which can be uniformly mixed with water are not limited. Some examples of such materials are soybean protein, egg white, milk serum protein, etc., and mixtures of the above.

As described, when each material used in the biodegradable molded articles has a low water content, the total water content is low, and the above-mentioned additional effects can be achieved. Some examples of such proteins having low water content (not more than 10%) are soybean protein, egg white milk serum protein, wheat protein, gluten, collagen, etc., and mixtures of the above.

For example, as in the case of preparing sample B, by using materials containing proteins such as wheat and/or starches, etc., biodegradable molded articles having a sufficient strength required in their use and storage, etc., can be achieved.

Examples of the materials that can be used in the method for preparing the biodegradable molded articles of this example have been shown above. However, the materials that can be used in the method of this example are not limited to those above as long as they can be decomposed by microbes, bacteria, etc., in the soil. Some other examples of such materials are: (1) proteins, such as plant or animal proteins, such as soybean protein, corn protein, casein, gluten, egg white, milk protein, wheat protein, collagen, microbe protein (single cell protean), etc., and mixtures of above; (2) the materials including proteins, such as grain powder, such as soybean powder, corn powder, wheat powder, etc., or materials including egg, dairy products, etc., and mixtures of the above; (3) starches, such as those of corn, potato, tapioca, rice, sweet potato, wheat, etc., starch derivatives such as α-starches or denatured starches of the above, and mixtures of the above; and (4) residues (by-products or wastes produced in food industries during the manufacturing process) remaining after taking out essential portions of effective elements in foods and/or food materials, such as vegetables, fruits, grains, etc.; and (5) mixtures of (1)–(4).

Some examples of residues are:

(a) squeezed and strained residues resulting from producing, processing or manufacturing foods made from vegetables or fruits, such as celery, carrot, tomato, citrus fruits (orange, lemon, grapefruit, etc.), apple, grape, berries, pineapple, sugar cane, sugar beet, etc.;

(b) Residues resulting from producing processed foods made from grains, (for example, the residue from TOFU(soybean curd) processing, which is called OKARA in Japan), or residues resulting from production of liquors (Sake, distilled spirits, beer, etc.) from grains and malts;

(c) Residues resulting from infusing table luxuries, such as coffee, tea, ptisan, green tea, oolong tea, etc., for example, ground beans and leaves after infusion, wastes of canned or bottled beverage manufactures;

(d) Residues resulting from the processing of oil by squeezing, pressing, or extracting soybean, corn, rapeseed, sesame, etc;

(e) Residues, such as wheat bran, rice bran, rice hull, etc., resulting from refining grains, or residues such as gluten meal, etc., resulting from starch production;

(f) Residues, such as baking crumbs of cone cups, biscuit, wafer, waffle, etc., resulting from producing confectioneries;

(g) Residues noted in (a)–(f) having applied thereto drying process and crushing process; and (h) The mixtures of the residues noted An (a)–(g).

By manufacturing biodegradable molded articles in accordance with the present invention with using the above-described residues as the materials, it is possible to efficiently re-utilize the useless portions resulting various food processing on an in industrial scale. At present, there is no other practical treatment of these useless portions (residues) than simply discarding then as waste or garbage. Therefore, we can reduce problems associated with discarding these useless portions.

The above-listed materials may be used as a principal material together with the following auxiliary materials.

As the strength adjusting agents for the molded articles, any of the materials noted in (1)–(5) may be used. Some other examples are:

(6) Saccharides, for example, monosaccharides, such as glucose, fructose, disaccharide, such as sucrose, maltose, lactose, oligosaccharides, corn syrup, dextrins, isometric saccharides, etc., and mixtures of the above;

(7) Sugar alcohols such as sorbitol, mannitol, lactitol, etc., and the mixtures of the above;

(8) Fats and oils, such as vegetable oils, animal fats, processed fats, and mixtures of the above;

(9) Wax such as carnauba wax, candelilla wax, beeswax, paraffin wax, microcrystalline wax, etc., and mixtures of the above;

(10) Thickening polysaccharides, for example, those produced from microbes such as, xanthan gum, gellan gum, etc., those produced from plants such as guar gum, locust bean gum, pectin, arabic gum, tamarindus gum, carrageenan, karaya gum, tara gum, and mixtures of the above; and (11) Salts, such as salts of chloride, sulfate, organic oxide, nitride, carbonate, hydroxide, phosphoride, etc., or metal salts, such as calcium, sodium, potassium, aluminum, magnesium, iron, etc, and mixtures of the above;

(12) insoluble minerals such as ground quartz, diatomite, talc, silicone, etc., and mixtures of the above;

(13) Fibers, such as cellulose, microcrystalline cellulose, paper, carboxymethylcellulose, methylcellulose, acetylcellulose, etc., and their derivatives and mixtures of the above;

(14) Inorganic substances such as glass, metal, carbon, ceramic, and fibers thereof, structural materials, and mixtures of the above;

(15) Shells, powdered bones, egg shells, leaves, powdered wood, and the mixtures of the above;

(16) Non-fiber fillers, such as calcium carbonate, carbon, talc, titanium dioxide, silica gel, aluminum oxide, etc., and mixtures of the above;

(17) Fatty acids, such as stearic acid, lactic acid, lauric acid, salts such as metal salts of the above, and fatty acid derivatives such as amide acid, ether, etc., and mixtures of the above;

(18) glycerin, polyglycerin, propylene glycol, ethylene glycol, esters of fatty acid with glycerin, esters of fatty acid with polyglycerin, esters of fatty acid with propylene glycol, sugar ester, lecithin, esters of fatty acid with sorbitan, polysorbate, etc., or other food additives, and mixtures thereof;

(19) Resins such as shellac, rosin, sandarac resin, gutta percha, dammar gum, etc., biodegradable resins, such as as polyvinyl alcohol, polylactic acid, and mixtures of the above;

(20) Acetyl tributyl citrate, zirconium salt solution, ammonium zirconium carbonate alkyl solution, or mixtures of the above; and (21) Mixtures of the noted materials An (1)–(20).

For the plasticizer as one of auxiliary materials, any material selected from the above noted (1) through (17) and (19) may be adopted. Other than above examples include: for example, (22) acetyl tributyl citrate and alcohols, such as glycerin, polyglycerin, propylene glycol, ethylene glycol, etc., or mixtures of the above; and (23) Mixtures of the above plasticizers.

Similarly, examples of emulsifying agents include: esters of fatty acid with glycerin, esters of fatty acid with polyglycerin, esters of fatty acid with propylene glycol, sugar esters, esters of fatty acid with sorbitan, lecithin, polysorbate, etc., and mixtures of the above.

The stabilizing agents may be a material selected from (1) through (3), (6), (7), (10), (13) (excluding paper), (17), (24) and the mixtures thereof.

The separating agents may be a material selected from (8), (9), (17), (25) and the mixtures of the above.

The adjusting agents of the texture and the uniformity of the molded articles may be a material selected from (1) through (21), (26) and the mixtures thereof.

The humectants may be a material selected from (1) through (11), (13), (15) through (18), (27) and the mixtures of the above.

The material handling adjusting agents may be any materials that can be used as the plasticizers, emulsifying agents, stabilizing agents, and (28) mixtures of the above.

Some examples of the electrical conductivity adjusting agents are the materials noted An (8)–(11), (29), amino acid salts, such as monosodium glutamate, etc., nucleotic acid salts, such as sodium inosinate, etc., generally used seasonings, such as vinegar, Sake, sweet SAKE (used as seasoning), spice, mustard, Japanese horseradish, MISO, etc., mixtures of the above, and (30) mixtures of the electrical conductivity adjusting agents of the above.

The dielectric loss adjusting agents may be a material selected from (8), (9), (11), (12), (14), (29), (31), zirconium salt, ammonium zirconium carbonate solution, and (32) mixtures of the above materials.

Some examples of preservatives are (33) sorbic acid and salts thereof (potassium salt, sodium salt, etc.), benzoic acid, salts thereof (potassium salt, sodium salt, etc.), ester compounds of benzoic acid, dehydroacetic acid, salts thereof (potassium salt, sodium salt, etc.), thiabenzazole, OPP (orthophenylphenol), salts thereof (potassium salt, sodium salt, etc.,), diphenyl, etc., and mixtures of the above.

Some examples of the expanding agents are (34) benzenesulfohydrazine compound, azonitrile compound, nitroso compound, diazoacetamide compound, azocarboxylic acid compound, ammonia system baking powder, sodium bicarbonate, ammonium alum, tartaric hydrogen salt (potassium, etc.,), magnesium carbonate, formulations of the above, and mixtures of the above.

Auxiliary materials other than the above, include seasonings noted in (29), and mixtures thereof, (35) inorganic pigment natural or synthetic dye, coloring agents such as caramel, cacao powder, carbon black, etc., and mixtures of the above, (36) flavors such as natural synthetic flavors, and adjusting agents, and mixtures thereof, and (37) the mixtures of materials noted in (29), (35) and (36).

Some examples of binding agents as auxiliary materials to be added to the principle material are water, proteins, starches, thickening polysaccharides, saccharides, plasticizers, emulsifying agents, fats and oils, stabilizers, and mixtures of the above. However, the hiding agents of the present example are not limited to the above.

The mixtures of any materials selected from the above auxiliary materials may be added.

Suitable combination and proportions of the materials vary depending on the properties of the respective materials to be used. More specifically, considering the properties required An manufacturing the molded articles (for example, the working efficiency), the properties required for the resulting molded articles (such as the shape, size and use of the molded articles, etc.,), the proportion of the materials to be used can be adjusted appropriately. For example, in order to prepare the molded articles for packaging materials, etc., a sufficient foam formation is required. Therefore, by the use of (34) sodium bicarbonate, tartaric hydrogen salt, benzenesulfohydrazine compound, etc., a molded article having desired properties can be prepared.

As a note, the method for preparing the biodegradable molded articles of the present example is not limited to the described preferred example, and various other processes may be applied. For example, the humidity controlling process may be performed after the electroconductive heating process is applied. As a result, the strength and the water-proof properties can be improved, and the fluctuation of the water content in the molded article during storage can be reduced. Therefore, deformation or cracking can be desirably prevented. The resulting molded article can be used as containers for foods containing water.

Additionally, after the electroconductive heating process is applied, the resulting product may be coated with a protein sheet. For example, by the following methods: the method of laminating the film, sheet, etc., made of protein, and the method of applying or spraying a protein solution, the protein layer is formed on the surface of the molded article. The protein layer formed on the surface of the molded article serves to protect the molded article from water. Therefore, since the resulting molded articles has desirable water proof properties, they can be used as containers for foods without creating the problem of water-leakage, etc. As a result, the molded articles which show improved strength can be achieved.

Additionally, after the electroconductive heating process As applied, the resulting molded articles may be coated with a resin, wax, wood wax, etc., having water resistance properties as well as biodegradable properties. Therefore, the molded articles are protected from water, and an improved water-resistance can be achieved.

The water content in the biodegradable molded articles in the present invention is not limited. However, by adjusting the water content of the molded articles after the molding process so as to fall in a range of 3–30%, the strength of the molded articles is further improved, thereby enabling more desirable application thereof for respective uses.

The molded articles manufactured by the method of the present invention are applicable to a wide variety of materials, such as containers, packaging materials, etc.

Some examples of such applications of molded articles are: the containers for hamburger, hot dog, French fried potato, deep fried chicken, Takoyaki, sausage, rice cake, ice cream, Chinese noodle, Japanese noodle, vegetables, fruits, meats, fish, dried foods, etc., and edible containers such as cone cups, wafer for soft ice cream, ice cream. The molded articles of the present invention can be used in a variety of fields, such as flowerpots, golf tees, packaging materials, garbage boxes, chopsticks, folding fans, etc, as well as food containers. The molded articles in this invention can easily be made lighter in weight or thinner, thus the containers stacked in a reduced volume can be thereby improving efficiency in their transportation and storage.

The above-described biodegradable molded articles show only an example, and the biodegradable molded articles of the present invention are not limited to this example.

Moreover, as described, the molded articles in this invention are biodegradable, and thus they are easily decomposed by microbes, bacteria, etc., in the soil. Therefore, the problem of environmental disruption associated with containers made from plastics can be eliminated. Additionally, although the period required for the degradation differs depending on the materials used in the molded articles, it is generally in the range of about 2–10 weeks.

After being used, the molded articles may be disposed An the soil, and in certain cases, the molded articles maybe used as the feed for animals.

EXAMPLE 2

Another Example of the present invention will be described below. Here, explanations of anything the same as in Example 1 will be omitted. The biodegradable molded articles of this example were prepared in the same manner as Example 1.

The proportion of the materials to be formed into the molded articles are shown in Table 3. Powdered milk serum proteins and water prepared in the proportion shown in Table 3 were placed in a mixer, and were mixed for two minutes, thereby obtaining a mixture of the powdered milk serum protein and water. A predetermined amount of mixed product was poured into a mold which had been previously, and the electroconductlve heating process was applied thereto. The resulting molded article was taken out from the mold, and was left at room temperature to cool it off, thereby obtaining the molded articles in a cup-shape.

The moldability, homogeneous structure and flexibility of the molded articles made from respective materials were observed. The results of the observations are also shown An Table 3. In Table 3, A indicates "excellent", and B indicates "good".

TABLE 3

| Material | Proportion (% by weight) | |
| --- | --- | --- |
| milkserum proteins | 70 | 50 |
| water | 30 | 50 |
| moldability | B | B |
| homogeneous structure | A | B |
| flexibility | A | B |

As clearly shown in Table 3, the biodegradable molded articles having desirable properties in their moldability, homogenous structure and flexibility could be obtained by the method of this example.

EXAMPLE 3

Another Example of the present invention will be described below. Here, explanations of anything the same as in the previous examples will be omitted. The biodegradable molded articles of this example were prepared in the same manner as Example 1.

The proportion of the materials to be formed into the molded articles are shown In Table 4. The moldability, homogeneous structure and flexibility of the molded articles made from respective materials were observed. The results of the observations are also shown in Table 4. The flexibility was measured using a rheometer. More specifically, the resulting molded article was set on a sample plate, and then a plunger was lowered from a predetermined position above the sample plate until the molded article was broken down, and the flexibility was measured based on the distance the plunger was lowered. In Table 4, A indicates "excellent", and B indicates "good".

TABLE 4

| Material | Proportion (% by weight) | |
|---|---|---|
| soybean protein | 60 | 40 |
| sugar | 0 | 20 |
| water | 40 | 40 |
| moldability | B | B |
| flexibility | B | A |
| homogeneous structure | B | A |

As clearly shown in Table 4, the biodegradable molded articles having desirable properties in their moldability, homogenous structure and flexibility could be obtained by the method of this example.

EXAMPLE 4

Another example of the present invention will be described below. Here, explanations of anything the same as in the previous examples wall be omitted. The biodegradable molded articles of this example were prepared in the same manner as Example 1.

The proportion of the materials to be formed into the molded articles are shown in Table 5. The molding time ratio and the strength of the molded articles made from the materials shown in Table 5 were measured. The results of the observations are also shown in Table 5. The strength was determined by measuring the maximum stress until the molded articles were broken down on the rheometer. In Table 5, A indicates "excellent", B indicates "good", and C indicates "relatively poor".

TABLE 5

| Material | Proportion (% by weight) | | |
|---|---|---|---|
| dried egg white | 35 | 35 | 60 |
| cellulose (strength adjusting agent) | 30 | 30 | 0 |
| sodium sulfate (electrical conductivity adjusting agent) | 1 | 2 | 2 |
| water | 34 | 33 | 38 |
| molding time ratio | 2 | 1 | 1 |
| strength | B | A | C |

As clearly shown An Table 5, the biodegradable molded articles having desirable strength could be prepared in the example. The results also proved that by adding the electrical conductivity adjusting agent, improved strength could be achieved, and that by adding the sodium sulfate as the electrical conductivity adjusting agent, the time required for the molding process could shortened.

EXAMPLE 5

Another example of the present invention will be described below. Here, explanations of anything the same as in the previous examples will be omitted. The biodegradable molded articles of this example were prepared An the same manner as Example 1.

The proportion of the materials to be formed into the molded articles are shown in Table 6. The moldability and mixability of the molded articles made from the materials shown An Table 6 were measured. The results of the observations are also shown in Table 6. In Table 6, A indicates "excellent", B indicates "good", and C indicates "relatively poor".

TABLE 6

| Material | Proportion (% by weight) | | |
|---|---|---|---|
| gluten meal (water content of 7%) | 65 | 64 | 64 |
| esters of fatty acid with polyglycerin (biding agent) | 35 | 35 | 0 |
| water | 0 | 0 | 35 |
| sodium polyphosphate (electrical conductivity adjusting agent) | 0 | 1 | 1 |
| moldability | C | A | B |
| mixability | A | A | C |

As clearly shown in Table 6, by adding the binding agent, biodegradable materials having desirable properties in their mixability could be obtained. Consequently, a molded article having an homogeneous structure could be obtained by the method of this example. The results also proved that by adding the electrical conductivity adjusting agent, improved moldability could be achieved.

EXAMPLE 6

Still another example of the present invention will be described below. Here, explanations of anything the same as in the previous examples will be omitted. The biodegradable molded articles of this example were prepared in the same manner as Example 1.

The proportion of the materials to be formed into the molded articles is shown in Table 7.

TABLE 7

| Material | Proportion (% by weight) |
|---|---|
| Residues of Sake (SAKE-KASU) | 100 |

Using the above material, the biodegradable molded articles could be manufactured desirably.

EXAMPLE 7

Another example of the present invention will be described below. Here, explanations of anything the same as in the previous examples will be omitted. The biodegradable molded articles of this example were prepared in the same manner as Example 1.

The proportion of the materials to be formed into the molded articles is shown in Table 8.

TABLE 8

| Material | Proportion (% by weight) |
| --- | --- |
| Residues resulting from squeezing and/or straining orange (Orange Juice Wastes) Wastes) | 85 |
| Egg White | 10 |
| Water | 5 |

Using the above materials, the biodegradable molded articles could be manufactured desirably.

EXAMPLE 8

Still another example of the present invention will be described below. Here, explanations of anything the same as in the previous examples will be omitted. The biodegradable molded articles of this example were prepared in the same manner as Example 1.

The proportion of the materials to be formed into the molded articles is shown in Table 9. The molding time ratio, the moldability and the foaming ratio of the molded articles made from the materials shown in Table 9 were observed. The results of the observations are also shown An Table 9. In Table 9, B indicates "good".

TABLE 9

|  | Proportion (% by weight) | |
| --- | --- | --- |
| OKARA | 70 | 70 |
| Salts (electrical conductivity adjusting agent) | 0.1 | 0 |
| Sodium Bicarbonate (expanding agent) | 0 | 0.5 |
| Water | 29.9 | 29.5 |
| Moldability | B | B |
| Foaming Ratio | 1 | 3 |
| Molding Time Ratio | 1 | 1 |

As clearly shown in Table 9, by adding the expanding agent, the molded articles having an improved foamability and uniformity in the foam structure could be obtained by the method of this example. Such molded articles showed high heat insulating efficiency and improved shock absorbing property.

Additionally, sodium bicarbonate not only served as the expanding agent, but also served as the electrolyte to improve the electrical conductivity.

EXAMPLE 9

Still another example of the present invention wall be described below. Here, explanations of anything the same as in the previous examples will be omitted. The biodegradable molded articles of this example were prepared An the same manner as Example 1.

The proportion of the materials to be formed into the molded articles is shown in Table 10. The moldability and strength of the molded articles made from the materials shown in Table 10 were observed. The results of the observations are also shown An Table 10. In Table 10, B indicates "good", and C indicates "relatively poor".

TABLE 10

| Material | Proportion (% by weight) | | |
| --- | --- | --- | --- |
| wheat | 6 | 6 | 6 |
| starch | 40 | 40 | 40 |
| sugar | 2.6 | 2.6 | 2.6 |
| oil | 1 | 1 | 1 |
| emulsifying agent | 0.4 | 0.4 | 0.4 |
| cellulose (strength adjusting agent) | 0 | 5 | 0 |
| paper (strength adjusting agent) | 0 | 0 | 2.5 |
| salts (electrical conductivity adjusting agent) | 0.5 | 0.5 | 0.5 |
| water | 49.5 | 44.5 | 47 |
| moldability | B | B | B |
| strength | C | B | B |

As clearly shown in Table 10, by adding the strength adjusting agent, biodegradable molded articles having desirable strength are obtained.

EXAMPLE 10

Another example of the present invention will be described below. Here, explanations of anything the same as in the previous examples will be omitted. The biodegradable molded articles of this example were prepared in the same manner as Example 1.

The proportions of the materials to be formed into the molded articles are shown in Table 11. The biodegradable molded articles in Example 10 are applicable to edible containers for foods such as cone cups or wafer for soft ice cream, ice cream, etc.

TABLE 11

| Material | Proportion (% by weight) | |
| --- | --- | --- |
| wheat | 38 | 29 |
| starch | 9 | 5 |
| sugar | 2 | 1 |
| oil | 0.6 | 0.6 |
| emulsifying agent | 0.1 | 0.1 |
| coloring matter | 0.05 | 0.05 |
| sodium bicarbonate (expanding agent) | 0.15 | 0.15 |
| flavor | 0.05 | 0.05 |
| monosodium glutamate (seasoning matter) | 0.05 | 0.05 |
| water | 50 | 50 |

The biodegradable molded articles made from the above materials showed a homogeneous structure and color and desirable strength.

EXAMPLE 11

Still another example of the present Invention will be described below. Here, explanations of anything the same as in the previous examples will be omitted. The biodegradable molded articles of this example were prepared in the same manner as Example 1.

The proportion of the materials to be formed into the molded articles is shown in Table 12.

TABLE 12

| Material | Proportion (% by weight) |
| --- | --- |
| Potato Starch | 60 |
| Talc (strength adjusting agent) | 0.4 |
| Guar Gum (Thickening Agent) | 0.4 |
| Salts (Electrical Conductivity adjusting agent) | 0.2 |
| Water | 39 |

The biodegradable molded articles made from the above materials showed a homogeneous structure and color and a desirable strength.

EXAMPLE 12

Still another example of the present invention will be described below. Here, explanations of anything the same as in the previous examples will be omitted. The biodegradable molded articles of this example were prepared in the same manner as Example 1.

The proportions of the materials to be formed into the molded articles are shown in Table 13. The moldability and the strength of the molded articles made from the materials were observed. The results of observations are also shown in Table 13. In table 13, A indicates "excellent", and B indicates "good".

TABLE 13

| Material | Proportion (% by weight) | | |
| --- | --- | --- | --- |
| potato starch | 60 | 60 | 60 |
| sodium bicarbonate (expanding agent) | 0.3 | 0.3 | 0.3 |
| sorbitol (plasticizer) | 3 | 1 | 7 |
| magnesium stearate (plasticizer) | 5 | 7 | 1 |
| sodium sulfate (electrical conductivity adjusting agent) | 0.5 | 0.5 | 0.5 |
| water | 31.2 | 31.2 | 31.2 |
| moldability | A | B | B |
| strength | *1 | *2 | *3 |

*1: flexible and firm
*2: hard and breakable
*3: soft and deformable

As clearly shown in Table 13, by adding 3% by weight of sorbitol and 5% by weight of magnesium stearate as plasticizers, the biodegradable molded articles having excellent moldability and flexible and firm properties could be obtained by the method of this example.

EXAMPLE 13

Still another example of the present invention will be described below. Here, explanations of anything the same as in the previous examples will be omitted.

The method for preparing the biodegradable molded articles of the present example used the process of Example 1 up to the electroconductive heating process. The proportion of the materials to be formed into the molded article is shown in Table 14.

TABLE 14

| Material | Proportion (% by weight) |
| --- | --- |
| wheat flour | 30 |
| starch | 16 |
| sugar | 2.6 |
| oil | 1 |
| emulsifying agent | 0.5 |
| water | 49.5 |

The resulting molded articles were divided into two groups, and on the surfaces of the molded articles in group 1, soybean protean sheets were laminated under an applied pressure. Here, soybean protein films may be used in place of soybean protein sheets.

In preparing these films or sheets, the generally used cast molding method, compressive press method, and extrusion molding method may be used. However, the methods are not limited to the above, and any methods which produce a smooth surface texture are preferable.

As the method for laminating the film or sheet on the molded articles, the generally used compressive lamination method, co-extrusion method, etc., may be used. However, the method is not limited to the above.

Alternatively, a film may be formed on the surface of the molded articles during the molding process from the protein which was mixed as one of the materials.

The thickness of the protein sheet is not limited. However, considering efficiencies in use, handling and storage of the biodegradable molded articles, the thickness of the protein sheet is preferably not more than 1 mm.

In this example, the molded article was coated with a protein sheet, placed in a mold, and subjected to pressure at a temperature in a range of 130° C.–150° C.

100 ml of water at 20° C. were poured in molded articles (Cups) having a protein sheet and poured in molded articles without the protein layer. The respective changes in time were observed to determine water resistance.

As a result, the molded articles having the protein sheet maintained their water resistance function for three hours, whereas the molded articles without the protein sheet maintained their water resistance for only ten minutes. Therefore, by forming the protein sheet on the surface of the biodegradable molded articles, a the molded article having a high water resistance can be obtained.

As described in this example, after applying the electroconductive heating process, the resulting molded article was coated with the protein sheet.

The protein sheet formed on the surface of the molded article served to protect the molded article from water and the molded article showed high water resistance and excellent water-proof function. Therefore, such molded articles can be desirably used as containers for foods with high water content without creating the problem of leakage, deformation or melting the surface of the containers.

Some examples of the materials for the molded articles to be coated are starches, proteins, paper, pulp mold and clothes, etc. However, suitable materials for such molded articles are not limited to the above.

Some examples of the protein for coating are casein, caseinate, soybean protein, collagen, gluten, egg white, zein, milk protein, gelatin, yeast powder or soybean powder which contain a high amount of protein, etc., or mixtures of the above. Again, suitable materials for film coating are not limited to the above.

When forming the protein film or sheet, an additive such as a plasticizer, etc. may be used if necessary.

Other than the described method for laminating the film or sheet made from, for example, protein, on the surface of the molded article, for example, a method of spraying the protein solution, or dipping the molded article in the protein solution, etc., may be used to form the protein layer on the surface of the molded article.

EXAMPLE 14

Still another example of the present invention will be described below. Here, explanations of anything the same in as the previous examples will be omitted.

The method for preparing the biodegradable molded articles of the present invention used the process of Example 1 up to the electroconductive heating process. In this example, the materials to be formed into the molded articles were prepared in the proportion shown in Table 14.

After the electroconductive heating process was applied, the coating materials with the proportion shown in Table 15 were painted on the surface of the molded article. Then, as in the same manner as Example 13, 100 ml of water at 20° C. was poured into the molded articles (Cups), and changes as time passed were observed to determine the water resistance.

TABLE 15

| Coating Materials | Proportion (% by weight) | | | | |
|---|---|---|---|---|---|
| dammar gum | 30 | 75 | 15 | 12 | — |
| shellac | — | — | 5 | 5 | — |
| rosin | — | — | 5 | 5 | 10 |
| carnauba wax | — | — | — | — | 90 |
| ethanol | 70 | — | 50 | 50 | — |
| acetone | — | — | 25 | 25 | — |
| propylene glycol | — | 25 | — | — | — |
| glycerin | — | — | — | 3 | — |
| water resistance | 24 h or above | 24 h or above | 24 h or above | 24 h or above | 24 h or above |

As clearly shown An Table 15, using the coating materials prepared in the proportion shown in Table 15, the biodegradable molded article having an excellent water resistance could be achieved.

As described in the present example, in order to achieve the same effect as Example 13, after applying the electroconductive heating process, the surface of the molded article was coated with the biodegradable resin, wax, wood wax, etc., so as to form a resin layer.

The resin layer formed on the surface of the molded article serves to protect the molded article from water. Such molded article can be applied to the containers for foods with high water content without creating the problem of leakage, etc. As a result, the water resistance and water proof function can be improved.

Other examples of the materials used in the coating are, for example, resins such as gutta percha, sandarac resin, shellac, jelutong, sorva, chicle gum, dammar resin, myrrha, peru balsam, gum rosin, wood rosin, resin tolu oil, etc., gilsonite, rubber, etc. However, the materials to be used in the coating are not limited to the above mentioned materials.

In preparing the resin solution, the solvent of alcohol, ether, carbon tetrachloride, acetone, benzene, ethyl acetate, toluene, hexane, etc., may be used. However, the suitable solvent in this example is not limited to the above.

The surface of the molded article may be coated by other methods than the method shown An this example, such as the method for spraying the resin solution or the method for dipping the molded article in the resin solution so as to form the resin layer on the surface of the molded article.

The thickness of the resin layer is not limited. However, considering use or handling and storage, etc., the thickness of 1 mm is preferable.

EXAMPLE 15

Still another example of the present invention will be described below. Here, explanations of anything the same as in the previous examples will be omitted. The materials to be formed into the molded articles in this example were prepared in the proportion shown in Table 14.

In this example, the biodegradable molded articles were prepared by adding the materials in the proportion shown in Table 16 to the raw materials to be molded, during mixing process. Thereafter, the electroconductive heating process was applied in the same manner as Example 1, thereby forming a resin layer made from additives on the surface of the molded articles.

100 ml of water at 20° C. was poured into the resulting molded articles (Cups), and the water resistance was determined by observing changes as time passed. The results of the observations are also shown in Table 16.

TABLE 16

| Additives | proportion (% by weight) | | |
|---|---|---|---|
| powdered dammar resin | 4 | 0.5 | 0 |
| silicone | 0 | 1 | 0 |
| carnauba wax | 0 | 0.5 | 0 |
| Water Resistance | 24 hours or above | 24 hours or above | ten minutes |

As clearly shown in Table 16, the molded articles including additives can ensure their water resistance function for more than 24 hours, whereas the molded articles without additives were only water resistant for 10 minutes. Thus, by adding the additives shown in Table 16, biodegradable molded articles having excellent water resistant characteristics could be obtained.

EXAMPLE 16

Still another example of the present invention will be described below. Here, explanations of anything the same as in the previous examples will be omitted.

The method for preparing the biodegradable molded articles of the present example used the electroconductive heating process of Example 1 and then performs humidity control treatment. In this example, the proportion shown in Table 14 is used for each material to be formed into the molded articles.

First, the materials are mixed and the electroconductive heating process was applied. Then, the resulting product was left at room temperature for cooling. Thereafter, the water content of the product was adjusted so as to fall in a range of 2–40% by weight. Then, in the same manner as in Example 4, the strength of the molded article was measured. Here, by the rheometer, the maximum stress when the molded article was broken down was measured so as to determine the strength. The water contents and the strengths are shown in Table 17.

TABLE 17

| Water Content (% by weight) | Strength (g) |
| --- | --- |
| 2 | 30 |
| 3 | 60 |
| 5 | 100 |
| 7 | 120 |
| 9 | 160 |
| 11 | 140 |
| 13 | 140 |
| 15 | 100 |
| 20 | 60 |
| 30 | 40 |
| 40 | 10 |

From the results of this example, it was clearly found that the water content of the molded article affects the strength greatly. The desired strength of the molded article could be obtained with the water content in the range of 3–30% by weight, more preferably in the range of 3–20% by weight, as shown in Table 17. As a result, deformation can be prevented and the resistance to cracking increased appropriately. Therefore, the molded article can be applied to each use appropriately. When the water content is below 3% by weight, sufficient strength of the molded article cannot be achieved. On the other hand, when the water content exceeds 30% by weight, the molded article becomes soft, and it cannot be maintained in the desired shape.

EXAMPLE 17

Still another example of the present invention wall be described below. Here, explanations of anything the same as in the previous examples will be omitted.

In this example, the materials to be formed into the molded articles were prepared in the proportion shown in Table 14, and as in the method of Example 1, the materials were mixed, and the electroconductive heating process was applied thereto. Thereafter, the resulting molded articles were divided into four groups, and were humidity controlled by the respective methods (1) through (4) so as to adjust the water content to 9% by weight, which gave the highest strength in Table 17.

(1) The molded article was placed in the desiccator for 24 hours;

(2) the molded article was subjected to a relative humidity of 60% at 25° C., for 8 hours.

(3) the molded article was subjected to a relative humidity of 65% at 35° C. for 4.5 hours, (4) the molded article was subjected to a relative humidity of 60% at 25° C. for 0.5 hours, and then subjected to a relative humidity of 80% at 40° C. for 1 hour, and then subjected to a relative humidity of 60% at 40° C. for 0.5 hours.

In the same manner as in Example 4, the strength of the molded article was measured. The maximum stress when the molded article was broken down was measured to determined the strength. As a result, as in the case of adjusting the water content to 9% by weight in Example 16, the strength of 160 g was obtained.

As is clear from this Example, by controlling the water content of the resulting product in several different ways after applying the electroconductive heating process, the molded article having improved strength can be obtained, and such molded articles is less likely to be deformed and has a stronger resistance to cracking. Therefore, they can be more effectively used.

EXAMPLE 18

Still another example of the present invention wall be described below. Here, explanations of anything the same as in the previous examples will be omitted.

In this example, the materials to be formed into the molded articles were prepared in the proportion shown in Table 18.

TABLE 18

| Composition | Material | Proportion (% by weight) |
| --- | --- | --- |
| A | flours | 33.3 |
| | starch | 22.7 |
| | sugar | 3.3 |
| | oil | 1.7 |
| | emulsifying agent | 0.3 |
| | salts | 1.0 |
| | water | 37.7 |
| B | potato starch | 60 |
| | sodium bicarbonate (expanding agent) | 0.3 |
| | sorbitol (plasticizer) | 3 |
| | magnesium stearate (plasticizer) | 5 |
| | sodium sulfate (electrical conductivity adjusting agent) | 0.5 |
| | water | 31.2 |

Figure 1:
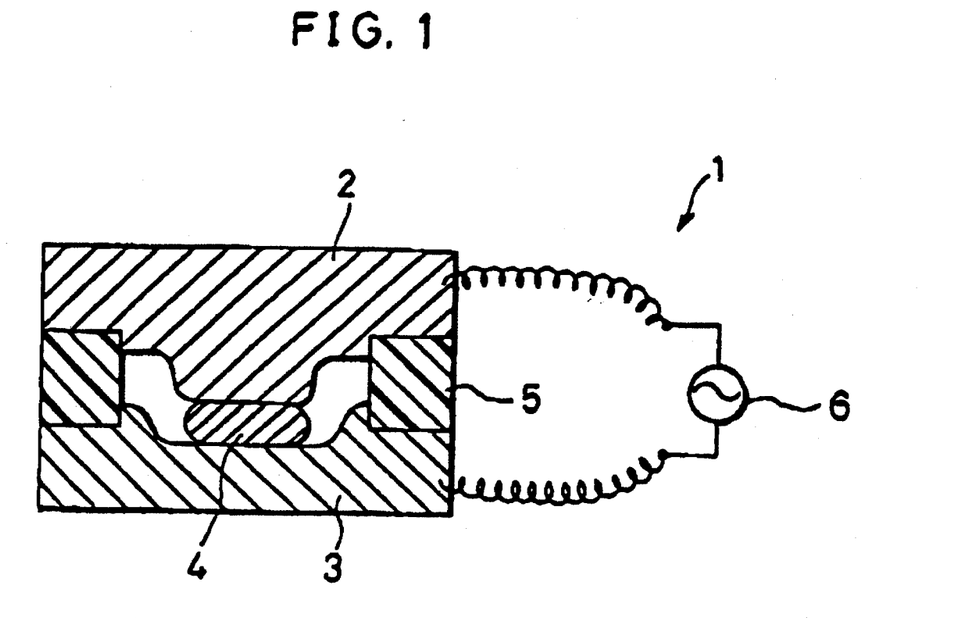
FIG. 1 is a cross-sectional view showing a schematic configuration of the manufacturing device used in a method for preparing biodegradable molded articles in accordance with one embodiment of the present invention.

FIG. 1 shows a schematic configuration of the electroconductive heating device used An preparing the biodegradable molded articles of the present example. In device 1 of the present example, a projected upper mold 2 made from aluminum and a recessed lower mold 3 made from aluminum are placed so as to face one another with materials 4 placed in-between. Along the respective circumferences of the projected and recessed faces, insulators 5 made from PEEK (polyether ether ketone) are placed. The upper mold 2 and the lower mold 3 also serve as electrodes, and the AC power supply 6 is connected thereto. The materials for the electrodes 2, 3 and the insulators 5 are not limited as long as the objectives of the present invention can be achieved. Examples of such materials of the insulators 5 include high-temperature resistance plastics. The electroconductive heating process was carried out under the following conditions: the AC power supply 6: 0–350 V (adjustable) and 13.56 MHz, and the current was set at three levels 0.3 A, 0.5 A and 0.7 A.

The process for preparing the biodegradable molded articles using the electroconductive heating device 1 is explained below.

The materials were prepared in the proportion shown in Table 18. The electrodes (upper mold 2 and lower mold 3) were heated to 140° C.

Next, an appropriate amount of the materials prepared in the described manner was placed on the lower mold 3. Then, the materials were electroconductively heated under the applied voltage, which was continuously adjusted to keep the current a predetermined amount (0.3, 0.5 and 1.7 A), across the upper mold 2 and the lower mold 3, which are tightly fastened.

As comparative samples, samples A and B were placed in the same molds as those used In this example 18 and then heated to 190° C. in order to obtain molded articles using a conventional heating system.

The properties results of the molded articles prepared by the described method are shown in Table 19. In Table 19, "C" indicates that formation of the molded articles was completed, and "U" indicates that formation of the molded articles was not completed, and "-" indicates that preparing of the molded articles was not performed.

TABLE 19

|  | Samples of this Example | | | | | | Comparative Samples | |
|---|---|---|---|---|---|---|---|---|
| Sample No. | A | | | B | | | A | B |
| Current (A) | 0.3 | 0.5 | 0.7 | 0.3 | 0.5 | 0.7 | | |
| Heating Time (second) | | | | | | | | |
| 30 | U | U | U | U | U | U | U | U |
| 40 | U | U | C | U | U | C | U | U |
| 50 | U | C | — | U | C | — | U | U |
| 60 | U | — | — | U | — | — | U | U |
| 90 | C | — | — | C | — | — | U | U |
| 210 | — | — | — | — | — | — | C | C |

The results proved that according to the method of this example, the molded article could be obtained in a shorter period of time compared with the method of the comparative samples. Also, it was proved that the molding time could be controlled (or shortened) by adjusting the amount of current.

Moreover, in this example, a molded article of homogeneous color and structure could be achieved.

The invention being thus described, it wall be obvious that the same may be varied An many ways. Such variations are not to be regarded as a departure from the spirit and scope of the invention, and all such modifications as would be obvious to one skilled in the art are intended to be included within the scope of the following claims.

What is claimed is:

1. A method for manufacturing biodegradable molded articles, comprising the steps of:

molding biodegradable raw materials; and heating the biodegradable raw materials by applying electroconductive heating to the biodegradable raw materials for an amount of time effective to foam and expand the biodegradable raw material to form the biodegradable molded article.

2. The method for manufacturing biodegradable molded articles as set forth in claim 1, further comprising the step of adding water to the materials before applying electroconductive heating, and wherein the materials include a protein.

3. The method for manufacturing biodegradable molded articles as set forth in claim 1, further comprising the steps of:

adding a binding agent to the materials before applying electroconductive heating, and wherein the materials include a protein containing not more than 10% by weight of water.

4. The method for manufacturing the biodegradable molded articles as set forth in claim 1, wherein:

the materials include a residue remaining after taking out essential portions of effective elements, from foods or food materials.

5. The method for manufacturing the biodegradable molded articles as set forth in claim 1, further comprising the step of adding water to the materials before applying electroconductive heating, and wherein the materials include an element selected from the group consisting of powdered grains and starches.

6. The method for manufacturing the biodegradable molded articles as set forth in claim 1, wherein:

the materials include a strength adjusting agent.

7. The method for manufacturing the biodegradable molded articles as set forth in claim 1, wherein:

the materials include a plasticizer.

8. The method for manufacturing the biodegradable molded articles as set forth in claim 1, wherein:

the materials include an emulsifying agent.

9. The method for manufacturing the biodegradable molded articles as set forth in claim 1, wherein:

the materials include a stabilizer.

10. The method for manufacturing the biodegradable molded articles as set forth in claim 1, wherein:

the materials include a separating agent.

11. The method for manufacturing the biodegradable molded articles as set forth in claim 1, wherein:

the materials include an adjusting agent for adjusting a texture and a homogeneous structure of the materials.

12. The method for manufacturing the biodegradable molded articles as set forth in claim 1, wherein:

the materials include a humectant.

13. The method for manufacturing the biodegradable molded articles as set forth in claim 1, wherein:

the materials include a material handling adjusting agent.

14. The method for manufacturing the biodegradable molded articles as set forth in claim 1, wherein:

the materials include an electrical conductivity adjusting agent.

15. The method for manufacturing the biodegradable molded articles as set forth in claim 1, wherein:

the materials include a dielectric loss adjusting agent.

16. The method for manufacturing the biodegradable molded articles as set forth in claim 1, wherein:

the materials include a preservative.

17. The method for manufacturing the biodegradable molded articles as set forth in claim 1, wherein:

the materials include an expanding agent.

18. The method for manufacturing the biodegradable molded articles as set forth in claim 1, wherein:

the materials include a binding agent.

19. The method for manufacturing the biodegradable molded articles as set forth in claim 1, further comprising the step of coating the molded articles with a protein sheet after the step of applying electroconductive heating.

20. The method for manufacturing the biodegradable molded articles as set forth in claim 1, further comprising the step of coating the molded articles with a biodegradable resin after the step of applying electroconductive heating.

21. The method for manufacturing the biodegradable molded articles as set forth in claim 1, further comprising the step of adding a biodegradable resin to the materials before applying electroconductive heating.

22. The method for manufacturing the biodegradable molded articles as set forth in claim 1, further comprising the step of adjusting a water content of the molded articles to 3–30% after applying electroconductive heating.

* * * * *